H. C. WAITE.
AXLE SUPPORT.
APPLICATION FILED NOV. 22, 1911.
1,144,513.
Patented June 29, 1915.
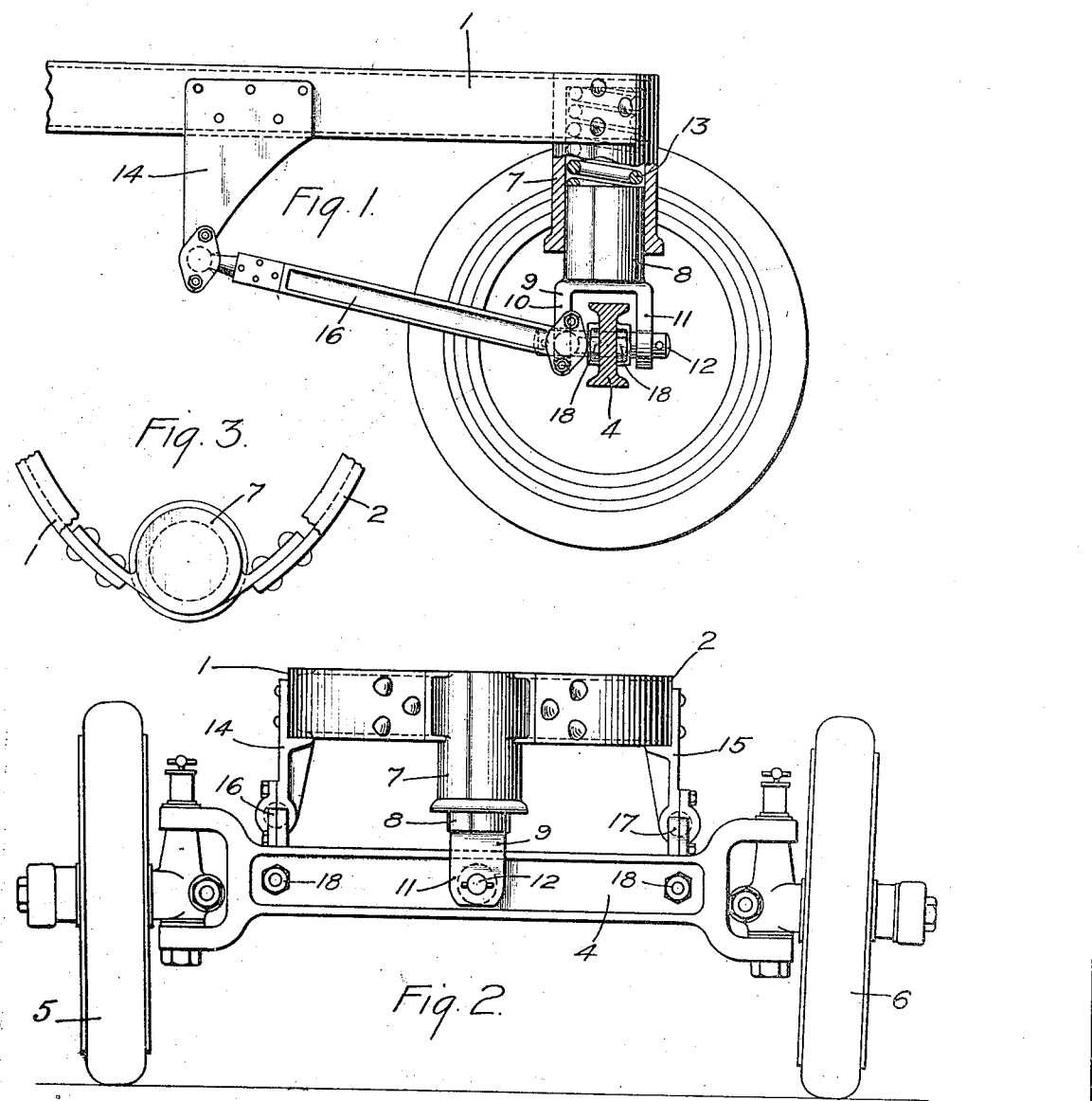

UNITED STATES PATENT OFFICE.

HARRY C. WAITE, OF LEWISTOWN, MONTANA, ASSIGNOR, BY DIRECT AND MESNE ASSIGNMENTS, TO INTERNATIONAL HARVESTER COMPANY OF NEW JERSEY, A CORPORATION OF NEW JERSEY.

AXLE-SUPPORT.

1,144,513.

Specification of Letters Patent.

Patented June 29, 1915.

Application filed November 22, 1911. Serial No. 661,796.

*To all whom it may concern:*

Be it known that I, HARRY C. WAITE, a citizen of the United States, and a resident of Lewistown, in the county of Fergus and State of Montana, have made a new and useful Invention in Axle-Supports, of which the following is a specification.

This invention relates to vehicles, and more particularly to an axle support.

One of the objects of the invention is to provide means for mounting an axle, as, for example, the front axle of the vehicle, so that it will be free to accommodate itself to road conditions, and to be so connected to the frame that strains or stresses will be directly taken on the frame of the vehicle.

Another object of the invention is to provide a yielding mounting for the axle, and so construct the whole that the axle will be resiliently connected to the frame in an efficient manner.

Other objects and advantages of my invention will appear hereinafter, it being understood that changes in form, proportion and minor details of construction of the invention may be resorted to without departing from the spirit of the invention or sacrificing any of its advantages.

In the drawings illustrating one embodiment of my invention, Figure 1 is an elevational view of one end of a vehicle to which my invention is attached; Fig. 2 is an end view of the same; and Fig. 3 is a fragmentary plan of the spring cylinder mounting.

Referring now to the drawings by numerals of reference: 1 and 2 designate the side bars of a vehicle frame curved toward each other and attached to a cylinder, to be referred to hereafter; 4 designates the axle carrying the vehicle wheels 5 and 6 in the usual manner. The axle and the frame are yieldingly secured together by a spring mechanism here illustrated as comprising a cylinder 7 fastened to the frame in any well known manner.

8 designates a piston or spring seat having a bifurcated end 9, the arms 10 and 11 of which straddle the axle 4 and are spaced a suitable distance on either side thereof.

Passing through an opening in the axle 4 is a pin 12, which also passes through the arms 10 and 11, and which is secured thereto in any well known manner. The pin 12 has a sliding fit through an enlarged center boss formed on the axle 4, so that there may be certain fore and aft movements between the axle and the bifurcated end of the spring seat or piston.

Between the piston 8 and one end of the cylinder 7 is a spring 13, upon which the body frame is supported, so as to be yieldingly held with relation to the axle with which it is connected.

Depending from the side frames 1 and 2 are brackets 14 and 15. These brackets are connected to the axle 4 by means of radius rods 16 and 17. The radius rods are here shown as being provided with ball and socket connections between the brackets and the axle. The axle connections are secured by fastening devices, as for example, the nuts 18, and are rigid with relation to the axle which carries them. The radius rods being on either side of the longitudinal center of the vehicle, it is obvious that the axle is free to move either up or down, or either end may tilt without binding on the spring suspension device, and yet it remains unyielding to the frame with reference to tension or thrust.

It will be observed that the radius rods also hold the front axle to the frame in so far as thrust or tension of the axle is concerned, the axle being pivoted at the center on the pin 12, which has a sliding fit with relation thereto. It is obvious that the axle may slide back and forth between the bifurcated arms, and that it may tilt vertically to accommodate itself to road conditions.

While I have specifically described one preferred form of my invention, it is obvious that the device may take other forms without departing from the generic features here involved.

Having thus described my invention, what I claim is:

1. In a vehicle, the combination of a frame having side members terminating in a cylinder member connecting said side members, an axle, a plunger having a relatively pivotal movement with respect to said axle and arranged to move in said cylinder, and a spring within said cylinder and bearing against said plunger to form a yieldable connection between said frame and axle.

2. In a vehicle, the combination of a frame having side members terminating in a cylinder member connecting said side members, an axle, a plunger having relatively pivotal and lateral movements with respect to said axle, a spring within said cylinder and bearing against said plunger to form a yieldable connection between said frame and axle, and a radius rod connection between said frame and axle.

In testimony whereof, I have hereunto subscribed my name this 6th day of November, 1911.

HARRY C. WAITE.

Witnesses:
C. C. WILLIAMSON,
H. H. OTTMAN.